US012720430B2

(12) United States Patent
Xu et al.

(10) Patent No.: US 12,720,430 B2
(45) Date of Patent: Aug. 25, 2026

(54) COMMUNICATION METHOD, TERMINAL, AND NETWORK DEVICE

(71) Applicant: GUANGDONG OPPO MOBILE TELECOMMUNICATIONS CORP., LTD., Dongguan (CN)

(72) Inventors: Weijie Xu, Dongguan (CN); Zhi Zhang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/602,809

(22) Filed: Mar. 12, 2024

(65) Prior Publication Data

US 2024/0259939 A1 Aug. 1, 2024

Related U.S. Application Data

(63) Continuation of application No. PCT/CN2021/118353, filed on Sep. 14, 2021.

(51) Int. Cl.
*H02J 50/20* (2016.01)
*H02J 50/00* (2016.01)
(Continued)

(52) U.S. Cl.
CPC ....... *H04W 52/0216* (2013.01); *H02J 50/001* (2020.01); *H02J 50/20* (2016.02);
(Continued)

(58) Field of Classification Search
CPC .......... H04B 1/38; H04B 1/40; H04W 52/02; H04W 52/0203; H04W 52/0206;
(Continued)

(56) References Cited

U.S. PATENT DOCUMENTS 9,386,427 B1 * 7/2016 Narasimhan ........... H04W 4/14
9,654,182 B2 5/2017 Tsukamoto
(Continued)

FOREIGN PATENT DOCUMENTS

CN 104143862 A 11/2014
CN 108565938 A 9/2018
(Continued)

OTHER PUBLICATIONS

International Search Report in the international application No. PCT/CN2021/118353, mailed on Jun. 9, 2022. 7 pages with English translation.

(Continued)

*Primary Examiner* — Young T. Tse
(74) *Attorney, Agent, or Firm* — Ladas & Parry LLP

(57) ABSTRACT

Provided are a communication method, a terminal and a network device. In the communication method, a terminal sends a wireless power supply parameter, where the wireless power supply parameter includes one or more of the following parameters: power harvesting efficiency of the terminal, a power harvesting speed of the terminal, harvesting time required by the terminal for acquiring a preset power, or a signal strength of a signal received by the terminal.

16 Claims, 19 Drawing Sheets

(51) Int. Cl.

| | |
|---|---|
| ***H02J 50/80*** | (2016.01) |
| ***H04W 52/02*** | (2009.01) |
| ***H04W 64/00*** | (2009.01) |
| ***H04W 72/0446*** | (2023.01) |
| ***H04W 72/115*** | (2023.01) |

(52) U.S. Cl.
CPC ............. *H02J 50/80* (2016.02); *H04W 52/02* (2013.01); *H04W 64/006* (2013.01); *H04W 72/0446* (2013.01); *H04W 72/115* (2023.01)

(58) Field of Classification Search
CPC ......... H04W 52/0209; H04W 52/0212; H04W 52/0216; H04W 52/0245; H04W 52/0261; H04W 52/0277; H04W 52/18; H04W 52/223; H04W 52/228; H04W 52/28; H04W 52/30; H04W 56/001; H04W 56/0095; H04W 64/006; H04W 72/0446; H04W 72/115; H02J 50/001; H02J 50/50; H02J 50/80
USPC ............... 375/219, 220, 259, 260, 267, 356; 370/277, 278, 328, 332, 350; 455/513, 455/522, 524
See application file for complete search history.

(56) References Cited

U.S. PATENT DOCUMENTS

2014/0337643 A1 11/2014 Tsukamoto
2019/0344371 A1* 11/2019 Denis ...................... H04W 4/70

FOREIGN PATENT DOCUMENTS

CN 108718466 A 10/2018
CN 109413731 A 3/2019
WO WO-2020150641 A1 * 7/2020 ............ H04B 7/024
WO 2021155209 A1 8/2021

OTHER PUBLICATIONS

Written Opinion of the International Search Authority in the international application No. PCT/CN2021/118353, mailed on Jun. 9, 2022. 9 pages with English translation.

Oppo, "New SID: Study on Wireless Power Sourcing enabled Communication Services in 5GS", 3GPP TSG-SA WG1 Meeting #94e S1-211120, Electronic Meeting, May 10-20, 2021, section 3. 3 pages.

Huawei et al., "Passive IoT for 5G Advanced", 3GPP TSG RAN Rel-18 workshop RWS-210453, Electronic Meeting, Jun. 28-Jul. 2, 2021, section 2. 6 pages.

Gharbirh Mohammad et al: "Grant-Free Opportunistic Uplink Transmission in Wireless-Powered IoT: A Spatio-Temporal Model", IEEE Transactions on Communications, IEEE Service Center, Piscataway, NJ. USA, vol. 69, No. 2, Nov. 24, 2020 (Nov. 24, 2020), pp. 991-1006, XP011837712, ISSN: 0090-6778, DOI: 10.1109/TCOMM.2020.3040210, p. 991-p. 995.

Quoc-Viet Pham et al: "A Survey of Multi-Access Edge Computing in 5G and Beyond: Fundamentals, Technology Integration, and State-of-the-Art", arxiv. org, Cornell University Library, 201 Olin Library Cornell University Ithaca, NY 14853, Jun. 20, 2019 (Jun. 20, 2019), XP081378326, p. 14-p. 15.

Supplementary European Search Report in the European application No. 21957021.5, mailed on Jul. 1, 2025.

* cited by examiner

Terminal
1600

Receiving unit
1610

Communication unit
1620

FIG. 16

Network device
1700

Receiving unit
1710

COMMUNICATION METHOD, TERMINAL, AND NETWORK DEVICE

CROSS-REFERENCE TO RELATED APPLICATION

This is a continuation application of International Patent Application No. PCT/CN2021/118353 filed on Sep. 14, 2021, the disclosure of which is incorporated by reference in its entirety.

BACKGROUND

A terminal (e.g. a zero-power terminal) usually needs to obtain power based on a wireless power supply signal sent by a network device before communication. At present, in order to ensure that the terminals can obtain enough power based on the wireless power supply signal, a conservative sending duration is usually predefined for the network device to send the wireless power supply signal.

However, the power required by different terminals may not be the same. For a terminal with less power required, the terminal may obtain enough power through the wireless power supply signal after a time period shorter than the conservative sending duration. At this time, if the wireless power supply signal was still sent for the conservative sending duration, resources will be wasted.

SUMMARY

The present disclosure relates to the field of communication technologies. The present disclosure provides a communication method, a network device and a terminal device, so as to improve the utilization rate of resources in a communication system.

In a first aspect, there is provided a communication method, which includes that: a terminal sends a wireless power supply parameter. The wireless power supply parameter includes one or more of the following parameters: power harvesting efficiency of the terminal; a power harvesting speed of the terminal; harvesting time required by the terminal for acquiring a preset power; or a signal strength of a signal received by the terminal.

In a second aspect, there is provided a communication method, which includes that: a network device receives a wireless power supply parameter sent by a terminal. The wireless power supply parameter includes one or more of the following parameters: power harvesting efficiency of the terminal; a power harvesting speed of the terminal; harvesting time required by the terminal for harvesting a preset power, or signal strength of a signal received by the terminal.

In a third aspect, there is provided a terminal, which includes a processor and a transceiver. The processor cooperates with the transceiver to implement the method of the first aspect.

In a fourth aspect, there is provided a network device, which includes a processor and a transceiver. The processor cooperates with the transceiver to implement the method of the second aspect.

BRIEF DESCRIPTION OF THE DRAWINGS

FIG. 16 illustrates a schematic diagram of a terminal according to another embodiment of the present disclosure.

FIG. 17 is a schematic diagram of a network device according to an embodiment of the present disclosure.

FIG. 18 is a schematic diagram of a network device according to another embodiment of the present disclosure.

DETAILED DESCRIPTION

The technical solutions of the present disclosure will be described below with reference to the accompanying drawings.

With the development of a wireless communication technology, it is hoped that a wireless communication system can be integrated with various vertical industries such as logistics, manufacturing, transportation and energy. For example, the wireless communication system can be integrated with an industrial wireless sensor network (IWSN). For another example, the wireless communication system can be integrated with a smart logistic and a smart warehousing. For another example, the wireless communication system can be integrated with an intelligent home network.

However, in these industries, terminals usually need to have characteristics of lower cost, smaller size (such as ultra-thin), maintenance-free, long life and so on. Therefore, in order to meet the above conditions, a zero-power communication technology may be used between the network device and the terminals. In this case, the terminal may also be called "a zero-power communication terminal".

Figure 1:
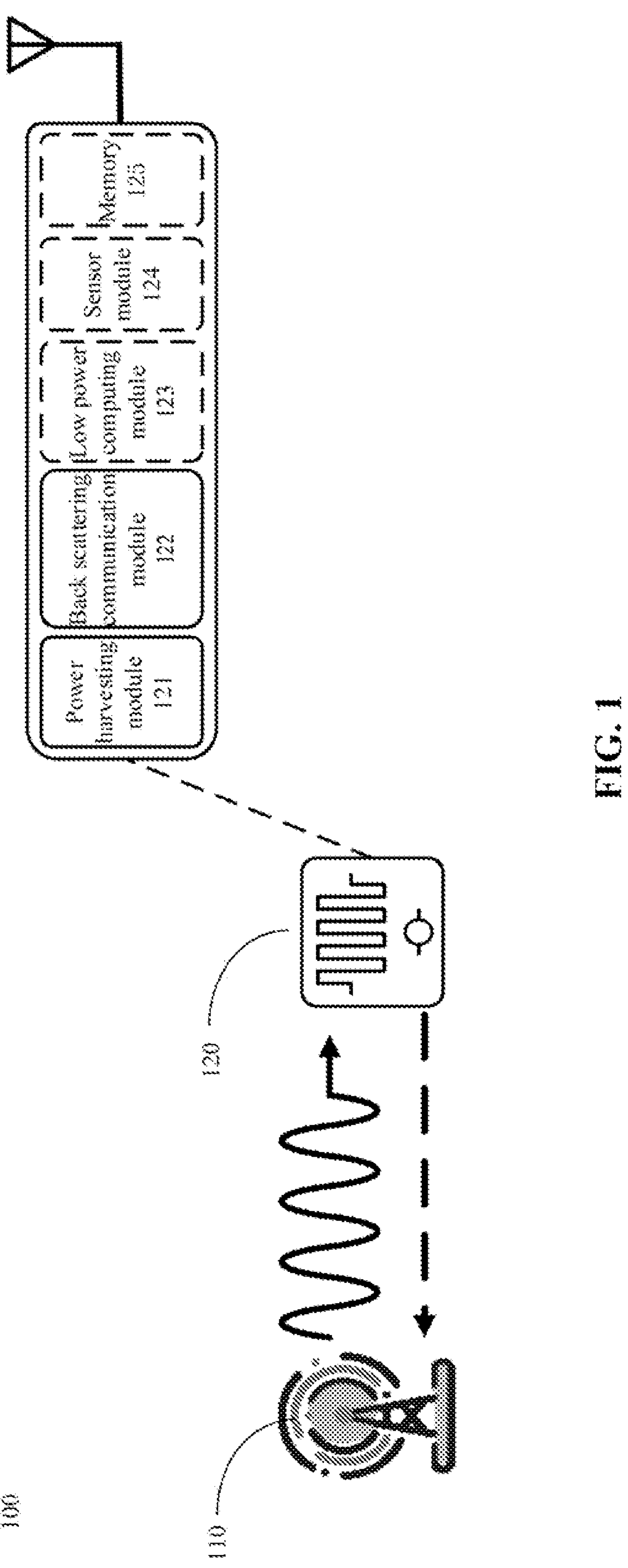
FIG. 1 illustrates a wireless communication system 100 applied in an embodiment of the present disclosure.

The zero-power communication technology and a zero-power terminal are described below in conjunction with FIG. 1 to FIG. 9. FIG. 1 is an architecture of a zero-power communication system 100 applicable to an embodiment of the present disclosure. The architecture illustrated in FIG. 1 includes a network device 110 and a terminal 120. The network device 110 may be a device that communicates with the terminal device 120. The network device 110 may provide communication coverage for a particular geographic area and may communicate with the terminal device 120 located within the coverage area.

The network device 110 is used for sending a wireless power supply signal to the terminal 120 to power the terminal 120. Accordingly, the terminal 120 may send data to the network device 110 through a back scattering signal. In some implementations, the wireless power supply signal may also carry data or control information sent by the network device 110 to the terminal 120. Alternatively, the wireless power supply signal may also be used only for power supply, and the embodiments of the present disclosure are not limited thereto.

It should be noted that FIG. 1 exemplarily illustrates one network device and one terminal. Optionally, the communication system 100 may include multiple network devices and other numbers of terminal devices may be included within the coverage of each network device, which is not limited by the embodiments of the present disclosure.

In addition, in some implementations, the communication system 100 may also include other network entities such as network controllers, mobility management entities and the like, which are not limited by the embodiments of the present disclosure.

The technical solutions of the embodiments of the present disclosure may be applied to various communication systems, such as a 5th generation (5G) system or a new radio (NR), a long term evolution (LTE) system, an LTE frequency division duplex (FDD) system, an LTE time division duplex (TDD) system, a cellular Internet of Things, etc. The technical solutions provided by the present disclosure may also be applied to a future communication system, such as a sixth generation mobile communication system, etc.

The terminal in the embodiments of the present disclosure may also be referred to as user equipment (UE), an access terminal, a user unit, a user station, a mobile platform, a mobile station (MS), a mobile terminal (MT), a remote station, a remote terminal, a mobile device, a user terminal, a terminal device, a wireless communication device, a user agent or a user device. The terminal device in the embodiments of the present disclosure may be a device that provides voice and/or data connectivity to the user and may be used to connect people, objects and machines, such as a household appliance, a sensor, an electronic tag with wireless connection functions, etc. The terminal in the embodiments of the present disclosure may be a wireless terminal in a smart home, a wireless terminal in an IWSN, a wireless terminal in a smart logistics and a smart warehouse, a wireless terminal in self driving, a wireless terminal in a remote medical surgery, a wireless terminal in a smart grid, a wireless terminal in transportation safety, a wireless terminal in a smart city, and the like.

The network device in the embodiments of the present disclosure may be a device for communicating with the terminal device. If the terminal is an electronic tag, the network device may be a reader-writer for reading and writing the electronic tag (for example, a reader-writer based on a radio frequency identification (RFID) technology). The network device may also be an access network device or a wireless access network device, for example, the network device may be a base station. The network device in the embodiments of the present disclosure may refer to a radio access network (RAN) node (or a device) that connects a terminal device(s) to a wireless network. The base station may broadly cover or replace the following names, such as a Node B (NodeB), an evolved NodeB (eNB), a next generation NodeB (gNB), a relay station, an access point, a transmitting and receiving point (TRP), a transmitting point (TP), a master station (MeNB), a secondary station (SeNB), a multi-standard wireless (MSR) node, a home base station, a network controller, an access node, a wireless node, an access point (AP), a transmitting node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node or the like, or a combination thereof. The base station may also refer to a communication module, a modem or a chip provided in the above device or equipment. The base station also may be a mobile switching center, a device that performs functions of the base station in device-to-device (D2D), vehicle-to-everything (V2X), and machine-to-machine (M2M) communications, a network-side device in a 6G network, a device that performs functions of the base station in future communication systems, etc. The base station may support networks with the same or different access technologies. The embodiments of the present disclosure are not limited to the specific technology and the specific device form adopted by the network device.

The base station may be fixed or mobile. For example, a helicopter or unmanned aerial vehicle may be configured to act as a mobile base station, and one or more cells may move depending on the location of the mobile base station. In other examples, the helicopter or unmanned aerial vehicle may be configured to serve as a device for communicating with another base station.

In some deployments, the network device in the embodiments of the present disclosure may refer to a CU or a DU, or the network device may include the CU and the DU. gNB may also include the AAU.

The network device and the terminal device may be deployed on land, including indoor or outdoor, hand-held or in-vehicle. The network device and the terminal device may also be deployed on the water. The network device and the terminal device may also be deployed on airplanes, balloons and satellites on the air, etc. Embodiments of the present disclosure are not limited to the scene in which the network device and the terminal device are located.

It should be understood that all or part of the functionality of the communication device in the present disclosure may also be implemented by a software functionality running on hardware or by the instantiated virtualization functionality on a platform (e.g. cloud platform).

To facilitate understanding of the zero-power communication technology, a terminal supporting the zero-power communication technology is described below in conjunction with FIG. 2.

Typically, the terminal 120 may include a power harvesting module 121 and a back scattering communication module 122. The power harvesting module 121 and the back scattering communication module 122 will be described below in conjunction with FIG. 2 to FIG. 4 and will not be repeated here for the sake of brevity. In some cases, the terminal 120 may also include a low power computing module 123. The low power computing module 123 is used for providing computing functions such as data processing and the like for terminals. In other cases, the terminal 120 may also include a sensor 124 for collecting external information (e.g. an ambient temperature, an ambient humidity, etc.). In other cases, the terminal 120 may also include a memory 125 for storing some information (e.g. external information acquired by the sensor described above or such as an item identification or the like).

The power harvesting module 121 is used for acquiring power. In some implementations, the power may be harvested through a wireless power supply signal sent by the network device. The wireless power supply signal may be a "radio frequency signal" sent by network device, so the power harvesting module is also called a "radio frequency power harvesting module".

Figure 2:
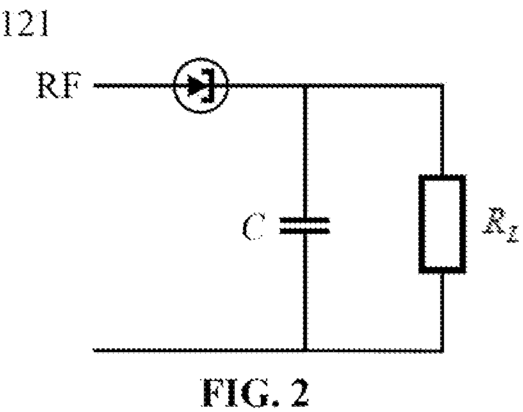
FIG. 2 illustrates a possible structure of a power harvesting module.

FIG. 2 illustrates a possible structure of a power harvesting module. As illustrated in FIG. 2, the power harvesting module 121 may harvest the power of a space electromagnetic wave of a radio frequency signal based on a principle of electromagnetic induction, and store the harvested power in a capacitor C, that is a charging process of the capacitor C. When the charging process of the capacitor C is finished, the capacitor C may start discharging to supply power for the terminal to work. For example, the discharge of the capacitor C may be used to drive the terminal to demodulate the data sent by the network device with low power. For another example, the discharge of the capacitor C may be used to drive the terminal to modulate the data to be sent by the terminal. For another example, the discharge of the capacitor C may be used to drive the sensor of the terminal for data acquisition. For another example, the discharge of the capacitor C may be used to drive the terminal to read data in the memory 125 or the like.

Figure 3:
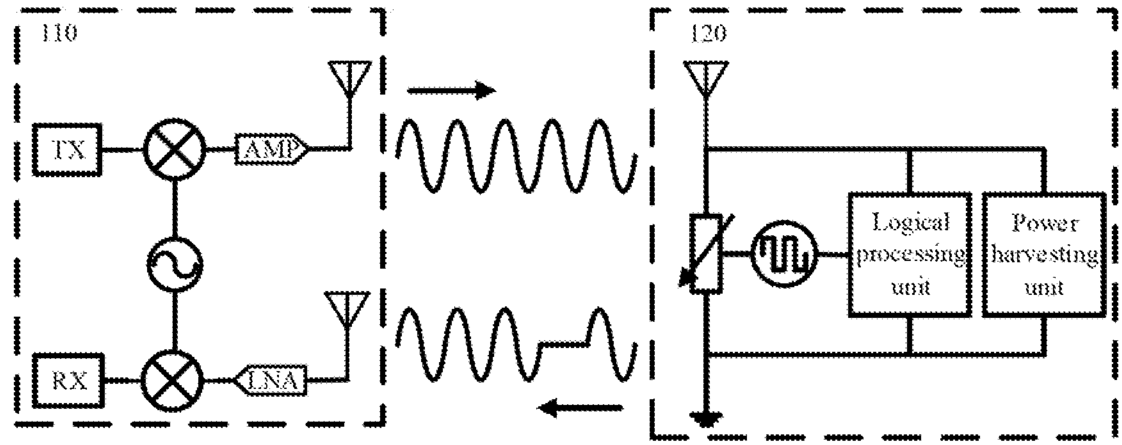
FIG. 3 illustrates a principle of a back scattering communication according to an embodiment of the present disclosure.

The above back scattering communication module 122 is used for a back scattering communication between the terminal and the network device. A principle of a back scattering communication in the embodiments of the present disclosure is introduced in combination with FIG. 3 below. Referring to FIG. 3, the terminal 120 receives a wireless signal sent by the network device 110 and modulates the wireless signal to load data to be sent. Finally, the modulated signal is radiated from antennas. This information transmission process is called the back scattering communication. The back scattering communication and a load modulation function are inseparable. The load modulation function may be understood as adjustment and control of circuit parameters of an oscillation loop of the terminal according to a beat of a data flow, so that the magnitude of impedance and other parameters of the terminal change accordingly, so as to complete the modulation process.

In some implementations, a transport (TX) path for the network device 110 may also be provided with other devices (such as an amplifier (AMP), etc) for processing a signal to be sent. A receive (RX) path for the network device 110 may also be provided with other devices (such as a low noise amplifier (LNA), etc) for processing the received signal.

In other implementations, the terminal 120 may be provided with a power harvesting unit for harvesting the power of the wireless power supply signal sent by the network device. Alternatively, a logical processing unit may also be provided in the terminal 120 to perform corresponding calculation functions.

It should be noted that whether for the network device 110 or the terminal 120, FIG. 3 only exemplarily illustrates the connection structure of the signal processing circuit, and the processing circuit of the network device 110 and/or the terminal 120 may include other elements, which are not specifically limited in the embodiments of the present disclosure.

Figure 4:
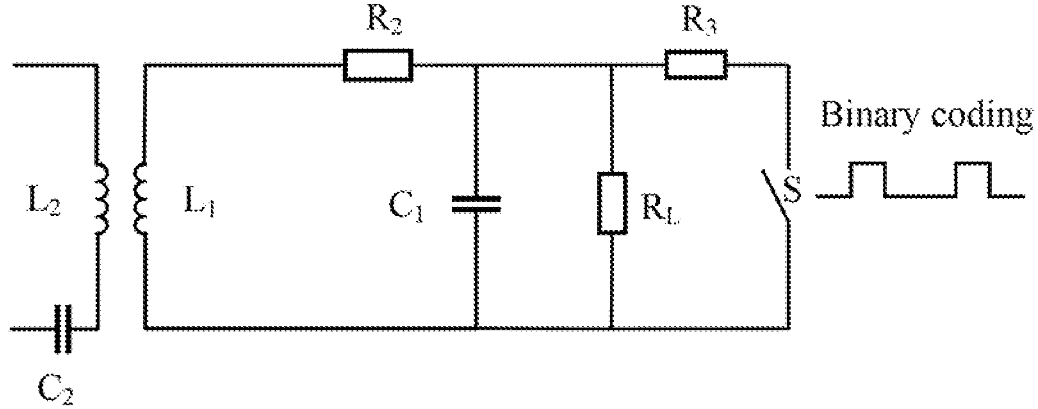
FIG. 4 illustrates a circuit diagram of a terminal based on a resistive load modulation technology.

Generally, the load modulation function may be realized by resistive load modulation and capacitive load modulation. FIG. 4 illustrates a circuit diagram of a terminal based on a resistive load modulation technology. It should be noted that the circuit described in FIG. 4 implements the load modulation technique in a manner similar to that of a conventional circuit for implementing the load modulation technique. For the sake of simplicity, the functions of resistors $R_2$ and $R_3$, capacitors $C_1$ and $C_2$, and inductors $L_1$ and $L_2$ included in FIG. 4 will not be described in detail.

In the resistive load modulation, a resistor $R_L$ may be connected in parallel with the load. A switch S may be used to realize on or off of the resistor $R_L$ based on the control of a binary data flow. In this way, the on or off of the resistor $R_L$ will cause a change of a voltage in the circuit, and the change of the voltage in the circuit may control an amplitude of a back scattering signal of the terminal, and then realize the modulation of the back scattering signal, that is, an amplitude-shift keying (ASK) modulation is performed on the back scattering signal.

Similarly, in the capacitor load modulation, the capacitor may be controlled to be on and off based on a binary data flow to change a resonant frequency of the circuit, and then change a working frequency of the back scattering signal, so as to realize a frequency-shift keying (FSK) modulation.

As mentioned above, the terminal may perform information modulation on an incoming wave signal (i.e., the signal sent by network device) in a manner of the load modulation, thus realizing the back scattering communication process. Therefore, the terminal in the back scattering communication usually have the following advantages.

A first advantage is that because the terminal does not need to send signals actively, construction of a complex radio frequency path is not needed. For example, a power amplifier (PA), a radio frequency filter and the like may not be provided in the radio frequency path to reduce the cost and volume of the terminal.

A second advantage is that because the terminal does not need to generate high-frequency signals actively, a high-frequency crystal oscillator is not needed, so as to reduce the cost and volume of the terminal.

A third advantage is that because the terminal can communicate with the network device by the back scattering technology, the terminal consumes lower power in communication, or even does not need to consume its own power.

The communication process and load modulation manner in the zero-power communication technology are introduced above with reference to FIG. 1 to FIG. 4. Encoding manners in the zero-power communication technology are described below with reference to FIG. 5 to FIG. 9.

For data transmitted by an encoding end (such as a terminal or an electronic tag), different encoding manners may be used to represent binary "1" and "0". Accordingly, a decoding end (e.g. the network device or a wireless radio frequency identification system) may use a corresponding decoding manner to decode a bitstream sent by the encoding end. Coding methods commonly used in the zero-power communication technology include: a non-return zero (NRZ) coding, a Manchester coding, a unipolar RZ coding, a differential binary phase (DBP) coding, a Miller coding, a differential coding and so on.

Figure 5:
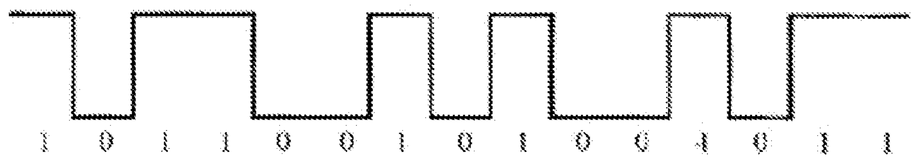
FIG. 5 is a schematic diagram of an encoding manner of an NRZ coding.

FIG. 5 is a schematic diagram of an encoding manner of an NRZ coding. Referring to FIG. 5, it can be seen that in the NRZ coding, a high level is used to denote a binary "1" and a low level is used to denote a binary "0".

Figure 6:
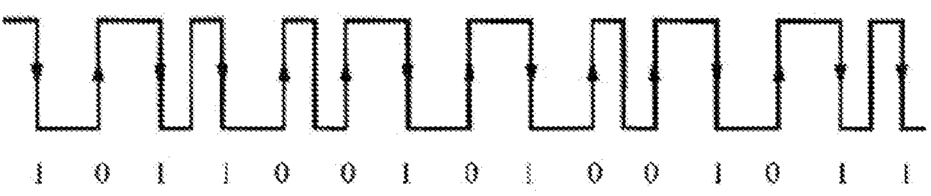
FIG. 6 is a schematic diagram of an encoding manner of a Manchester coding.

FIG. 6 is a schematic diagram of an encoding manner of a Manchester coding. The Manchester coding is also called a Split-Phase Coding. Referring to FIG. 6, in the Manchester coding, a value of a bit is represented by the change (rise or fall) of a level at half a bit period in a length of the bit. A negative jump at half a bit period is a binary "1", and a positive jump at half of a bit period is a binary "0". In some implementations, the Manchester coding is used commonly for data transmission from an electronic tag to a reader-writer because it facilitates the detection of data transmission errors. This is because a state of "no change" is not allowed within the length of the bit. When data bits sent by a plurality of electronic tags at the same time have different values, rising edges and falling edges received cancel each other, resulting in an uninterrupted carrier signal in the whole length of the bit. Because this state is not allowed, the reader-writer may determine a specific position where a collision occurs by using this error.

Figure 7:
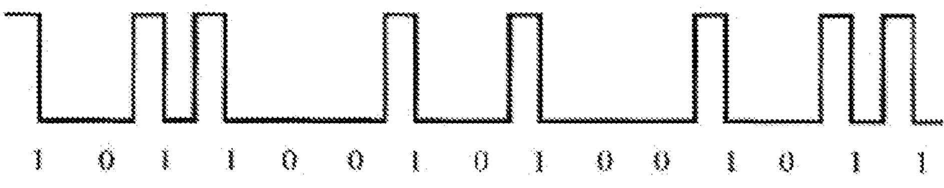
FIG. 7 is a schematic diagram of an encoding manner of a unipolar return-to-zero coding.

FIG. 7 is a schematic diagram of an encoding manner of a unipolar return-to-zero coding. Referring to FIG. 7, a high level of the unipolar return-to-zero coding in the first half a bit period represents a binary "1", while a low level signal lasting the whole bit period represents a binary "0". In some implementations, the unipolar return-to-zero coding may be used to extract bit synchronization signals.

Figure 8:
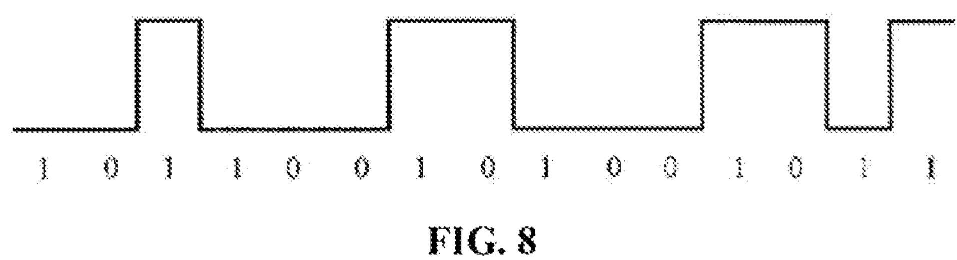
FIG. 8 is a schematic diagram of an encoding manner of a DBP coding.

FIG. 8 is a schematic diagram of an encoding manner of a DBP coding. As illustrated in FIG. 8, any edge of DBP in half a bit period represents a binary "0", while no edge represent a binary "1". In addition, at the beginning of each bit period, the level is inverted. Therefore, it is easier for the receiver to reconstruct a bit beat.

Figure 9:
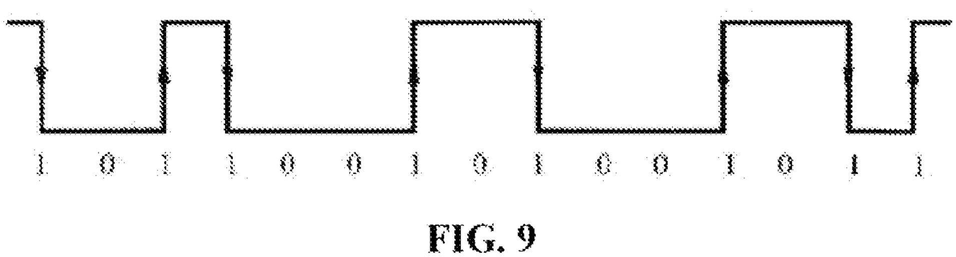
FIG. 9 is a schematic diagram of the encoding manner of a Miller coding.

FIG. 9 is a schematic diagram of the encoding manner of a Miller coding. Referring to FIG. 9, any edge of the Miller coding within half a bit period represents a binary "1", while a level that is unchanged over a next bit period represents a binary "0". Level alternating occurs at the beginning of the bit period, so that the bit beat is easier to be reconstructed for the receiver.

In addition, there is an encoding manner of a differential coding. In the differential coding, each binary "1" to be transmitted causes change of a signal level, while for a binary "0", the signal level remains unchanged.

Based on the introduction of zero-power communication technology above, it can be seen that the terminal in the zero-power communication (also called "a zero-power terminal") consumes little or even no power itself. Therefore, in the zero-power communication technology, terminals may include three types of terminals based on their power sources and power usage: a passive zero-power terminal, a semi-passive zero-power terminal and an active zero-power terminal.

1. Passive-Zero-Power Terminal

A passive zero-power terminal usually does not require built-in batteries. When the terminal approaches the network device, the terminal is in a near field range formed by antenna radiations of the network device. At this time, antennas of the terminal may generate an induced current through electromagnetic induction, and the induced current may supply power for the terminal to realize demodulation for the received signal and/or modulation, encoding and the like for the signal to be transmitted. In some implementations, the passive zero-power terminal may be an electronic tag, and accordingly, the network device may be a reader-writer of a radio frequency identification (RFID) system for reading contents of the electronic tag and/or for modifying the contents of the electronic tag.

2. Semi-Passive Zero-Power Terminal

The semi-passive zero-power terminal itself is not equipped with conventional batteries, but it may harvest radio wave power using a power harvesting module 121 and store the harvested power in a power storage unit (such as a capacitor). After obtaining power, the power storage unit can supply power to the terminal to realize demodulation for the received signal and/or modulation, encoding and the like for the signal to be transmitted.

3. Active Zero-Power Terminal

The active zero-power terminal may have built-in batteries. The batteries may supply power to the terminal to realize demodulation for the received signal and/or modulation, encoding and the like for the signal to be transmitted. However, when the terminal device uses the back scattering technology to communicate, the terminal does not need to consume the power of the batteries. Therefore, for this kind of terminal, "zero-power consumption" is mainly reflected in the scene where the terminal uses the back scattering technology to communicate.

In some implementations, the active zero-power terminal may be an electronic tag, and the network device may be an RFID reader-writer. At this time, the built-in batteries may supply power to an RFID chip in the terminal to increase a reading and writing distance between the RFID reader-writer and the electronic tag. On the other hand, the built-in batteries may supply power to the RFID chip in the terminal, so as to shorten a delay of reading and writing the electronic tag by the RFID reader-writer, which is beneficial to improve the reliability of communication.

As described above, the zero-power terminal usually needs to obtain power based on the wireless power supply signal sent by the network device before communication. At present, in order to ensure that the terminal can obtain enough power based on the wireless power supply signal, a conservative sending duration is usually predefined for the network device to send the wireless power supply signal.

However, the power required by different terminals may not be the same. For a terminal with less power required, the terminal may obtain enough power through the wireless power supply signal after a time period shorter than the conservative sending duration. At this time, if the wireless power supply signal was still sent for the conservative sending duration, resources will be wasted. On the other hand, for the terminal with less power required, the terminal can obtain enough power after the time period shorter than the conservative sending duration. If the network device still sends the wireless power supply signal according to the conservative sending duration, the power of the network device will be wasted. On the other hand, for the terminal with less power required, the terminal can obtain enough power after the time period shorter than the conservative sending duration. If the network device still sends the wireless power supply signal according to the conservative sending duration, it may cause interference to other signals.

Therefore, in order to avoid the above problems, the present disclosure provides a communication method in which the terminal may send a wireless power supply parameter to the network device to indicate a power required by the terminal to the network device, so that the network device can determine the sending duration of the wireless power supply signal based on the wireless power supply parameter.

Figure 11:
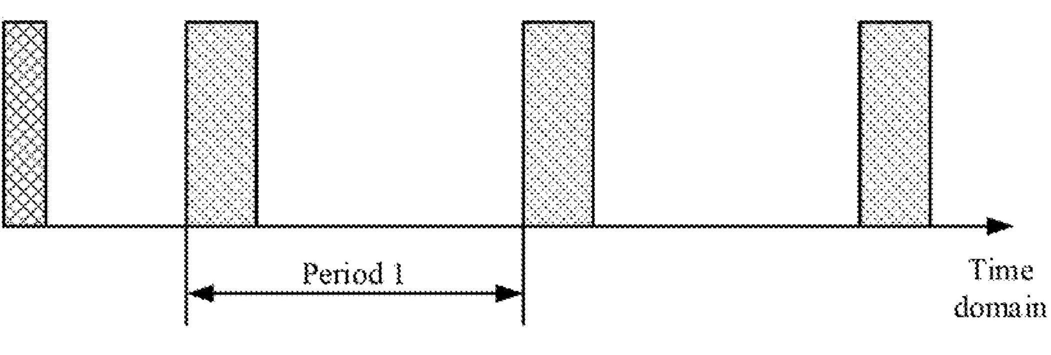
FIG. 11 is a schematic diagram of grant free transmission.

For ease of understanding, the information contained in the wireless power supply parameter in the embodiments of the present disclosure will be described first, and then the flow of the communication method of the embodiments of the present disclosure will be described with reference to FIG. 11. It should be noted that in the embodiments of the present disclosure, for ease of understanding, "the wireless power supply parameter" is used to refer to a class of information having the above functions or including various parameters described below. The class of information having the above functions or including various parameters described below may also be parameters or information with other names specified in future agreements. Embodiments of the present disclosure are not limited thereto.

The above wireless power supply parameter includes one or more of the following parameters: power harvesting efficiency of the terminal, a power harvesting speed of the terminal, harvesting time required by the terminal for harvesting a preset power, and a signal strength of a signal received by the terminal. The above parameters will be introduced one by one below.

A first parameter is the harvesting time required by the terminal for acquiring the preset power.

The preset power may be understood as the power required for the normal operation of the terminal. The normal operation of the terminal may include, for example, one or more of operations of receiving a signal, demodulating a signal, modulating a signal, encoding a signal, etc. by the terminal. Accordingly, the harvesting time required by the terminal for acquiring the preset power may be understood as harvesting time required by the terminal to complete the harvesting of the preset power when the network device sends the wireless power supply signal.

Generally, the preset power corresponding to different terminals may be different, and the preset power of a terminal may be related to a type, a working condition and hardware parameters of the terminal. The hardware parameters of the terminal may be parameters of the power harvesting module (also called "a power receiver") of the terminal.

In the embodiments of the present disclosure, there is no limit made to the specific manner in which the terminal obtains the harvesting time. In some cases, the harvesting time may be pre-configured in the terminal by testing before the terminal leaves a factory. In other cases, the harvesting time of the terminal may change with the working condition of the power harvesting module or with the working condition of the terminal. At this time, in order to improve the accuracy of the harvesting time, the terminal may calculate the harvesting time by itself. For example, the terminal may determine the harvesting time based on historical wireless power supply signals. In the embodiments of the present disclosure, the manner in which the terminal obtains the harvesting time is not limited thereto.

A second parameter is the power harvesting efficiency of the terminal.

The power harvesting efficiency of the terminal may be characterized by a ratio between a power of a signal when the signal arrives at the terminal and a power of a signal obtained by the terminal when the signal is acquired. Generally, the power harvesting efficiency will affect the power harvesting time, and then affect the sending duration of the wireless power supply signal. For example, for a terminal with higher power harvesting efficiency, time required to harvest enough power is shorter, and accordingly, the sending duration of the wireless power supply signal will be shorter. For another example, for a terminal with lower power harvesting efficiency, time required to harvest enough power is longer, and accordingly, the sending duration of the wireless power supply signal will be longer.

On the other hand, when the power harvesting efficiency of the terminal is constant, a signal strength of a wireless power supply signal when the wireless power supply signal arrives at the terminal will also affect the time required for the terminal to harvest enough power. In some cases, assuming that the power harvesting efficiency of the terminal is constant, the closer the terminal is from the network device, the stronger the power of the wireless power supply signal received by the terminal is, and the more the power of the wireless power supply signal will be harvested by the terminal, so that the terminal can obtain enough power in shorter time. On the contrary, in other cases, assuming that the power harvesting efficiency of the terminal is constant, the farther the terminal is from the network device, the weaker the power of the wireless power supply signal received by the terminal is, and the lower the power of the wireless power supply signal harvested by the terminal is, so that the terminal requires longer time to obtain enough power.

It should be noted that the above enough power may be understood as a power required for normal operation of the terminal. The normal operation of the terminal may include, for example, one or more of the operations of receiving a signal, demodulating a signal, modulating a signal, encoding a signal, etc. by the terminal.

In addition, for a terminal, the power harvesting efficiency of the terminal is not fixed. The stronger the power of the wireless power supply signal is when it arrives at the terminal, the higher the power harvesting efficiency of the terminal is. The weaker the power of the wireless power supply signal is when it arrives at the terminal, the lower the power harvesting efficiency of the terminal is. For example, if the power of the wireless power supply signal is 100 milliwatts when it arrives at the terminal, the power harvesting efficiency of the terminal may be 50%. If the power of the wireless power supply signal is 20 milliwatts when it reaches the terminal, the power harvesting efficiency of the terminal may be 20%. Therefore, the terminal calculates its own power harvesting efficiency in real time, which is beneficial to improve the accuracy of determining the sending duration of wireless power supply signal.

Generally, the power harvesting efficiency of different terminals may be different, and the power harvesting efficiency of a terminal may be related to the type, working condition and hardware parameters of the terminal. The hardware parameters of the terminal may be parameters of the power harvesting module (also called "a power receiver") of the terminal.

In the embodiments of the present disclosure, the power harvesting efficiency of the terminal may be pre-configured in the terminal by testing before the terminal leaves a factory. The power harvesting efficiency of the terminal may also be calculated in real time by the terminal based on historical data. For example, the power harvesting efficiency of the terminal may be determined by the terminal based on a ratio between a power of the historical wireless power supply signal arriving at the terminal and a power obtained by the terminal performing harvesting on the signal. There is no limit made to the manner in which the terminal obtains the power harvesting efficiency in the embodiments of the present disclosure.

A third parameter is the power harvesting speed of the terminal.

The power harvesting speed of the terminal may be characterized by the power obtained by the terminal performing harvesting of the wireless power supply signal in unit time. Generally, the power harvesting speed will affect the power harvesting time, and then affect the sending duration of the wireless power supply signal. For example, for a terminal with higher power harvesting speed, the time required to harvest enough power is shorter, and accordingly, the sending duration of the wireless power supply signal will be shorter. For another example, for a terminal with lower power harvesting speed, the time required to harvest enough power is longer, and accordingly, the sending duration of the wireless power supply signal will be longer.

On the other hand, when the power harvesting speed of the terminal is constant, the signal strength of a wireless power supply signal when it arrives at the terminal will also affect the time required for the terminal to harvest enough power. In some cases, assuming that the power harvesting speed of the terminal is constant, if the terminal is closer to the network device, the power of the wireless power supply signal received by the terminal is stronger, and the power of the wireless power supply signal will be harvested by the terminal, so that the terminal can obtain enough power in shorter time. On the contrary, in other cases, assuming that the power harvesting speed of the terminal is constant, the farther the terminal is from the network device, the weaker the power of the wireless power supply signal received by the terminal is, and the lower the power of the wireless power supply signal will be harvested by the terminal, so that the terminal requires longer time to obtain enough power.

It should be noted that the enough power may be understood as the power required for the normal operation of the terminal. The normal operation of the terminal may include, for example, one or more of the operations of receiving a signal, demodulating a signal, modulating a signal, encoding a signal, etc. by the terminal.

Generally, the power harvesting speed of different terminals may be different, and the power harvesting speed of a terminal may be related to the type, working condition and hardware parameters of the terminal. The hardware parameters of the terminal may be parameters of the power harvesting module (also called "a power receiver") of the terminal.

In the embodiments of the present disclosure, the power harvesting speed of the terminal may be pre-configured in the terminal by testing before the terminal leaves a factory. The power harvesting speed of the terminal may also be calculated in real time by the terminal based on historical data. For example, the terminal may determine the power harvesting speed of the terminal based on a total power obtained by power harvesting of historical wireless power supply signals in unit time. There is no limit made to the manner in which the terminal obtains the power harvesting speed in the embodiments of the present disclosure.

A fourth parameter is the signal strength of the signal received by the terminal.

The signal received by the terminal may be understood as a signal sent by the network device to the terminal, and the network device may be a network device that needs to send the wireless power supply signal to the terminal.

Generally, the signal strength of the signal received by the terminal will affect the power harvesting time of the terminal, and then affect the sending duration of the wireless power supply signal. For example, if the signal strength of the signal received by the terminal is higher, the time required for the terminal to harvest enough power is shorter, and accordingly, the sending duration of the wireless power supply signal will be shorter. For another example, if the signal strength of the signal received by the terminal is lower, the time required for the terminal to harvest enough power is longer, and accordingly, the sending duration of the wireless power supply signal will be longer.

It should be noted that the enough power may be understood as the power required for the normal operation of the terminal. The normal operation of the terminal may include, for example, one or more of the operations of receiving a signal, demodulating a signal, modulating a signal, encoding a signal, etc. by the terminal.

Generally, the signal strength received by different terminals may be different, and the signal strength may be related to a distance between the terminal and the network device, a transmission path of the signal and other information.

In the embodiments of the present disclosure, the signal strength may be calculated by the terminal in real time based on historical data. For example, the terminal may detect the historical signal sent by the network device to determine the signal strength. The above signal strength may also be sent to the terminal by another terminal, where the distance between another terminal and the network device is similar to the distance between the terminal and network device. There is no limit made to the manner in which the terminal obtains the signal strength in the embodiments of the present disclosure.

A communication method of an embodiment of the present disclosure will be described below with reference to FIG. 10. The communication method described in FIG. 10 includes an operation S1010.

At S1010, the terminal sends the wireless power supply parameter to the network device.

The function of the above wireless power supply parameter and contents of the parameter included have been described above, and will not be repeated here for the sake of brevity.

In the embodiments of the present disclosure, the terminal may send a wireless power supply parameter to the network device to indicate the power required by the terminal to the network device, so that the network device may determine a sending duration of the wireless power supply signal based on the wireless power supply parameter, which is beneficial to improving the utilization rate of resources in the communication system. In addition, the problem of resource waste caused by the network device sending the wireless power supply signal according to a sending duration corresponding to a power that exceeds the power required by the terminal (that is, a conservative sending duration) in the traditional transmission process of the wireless power supply signal is avoided.

In some implementations, the wireless power supply parameter may be carried in a radio resource control (RRC) signaling. In other implementations, the wireless power supply parameter may be carried in a medium access control (MAC) control element (CE).

Accordingly, after receiving the wireless power supply signal, the network device may determine the first sending duration of the wireless power supply signal based on the wireless power supply parameter. That is, the method further includes operations S1020 to S1030.

At S1020, the network device determines the first sending duration for which the wireless power supply signal was sent based on the wireless power supply parameter.

In the embodiments of the present disclosure, there are many manners for the network device to determine the first sending duration based on the wireless power supply parameter. In some implementations, the network device may determine the first sending duration based on the received wireless power supply parameter, and a relationship between preset wireless power supply parameters and sending durations. The relationship between the preset wireless power supply parameters and the sending durations may be, for example, a functional relationship. Accordingly, the network device calculates the first sending duration based on the received wireless power supply parameter and the functional relationship. The relationship between the preset wireless power supply parameters and the sending durations may be, for example, a mapping table. In the mapping table, wireless power supply parameters may be divided into several levels, and different levels correspond to different sending durations. Thus, the network device may determine a corresponding level based on the received wireless power supply parameter and determine the first sending duration based on the corresponding level.

At S1030, the network device sends a wireless power supply signal to the terminal for a first sending duration.

Of course, in the embodiments of the present disclosure, the sending duration of the wireless power supply signal sent by the network device may be slightly longer than the first sending duration. For example, when the communication system is in an idle state and there is not much data to be transmitted, the network device may send the wireless power supply signal for a second sending duration, where the second sending duration is longer than the first sending duration.

Generally, the mobile state of the terminal will also affect the time for which the wireless power supply parameter is valid to a certain extent. For example, when the terminal starts to move, an environment in which the terminal is located has an impact on the quality of signal transmission, and the wireless power supply parameter will change at this time. For another example, when the terminal starts to move, a distance between the terminal and the network device also changes, and the wireless power supply parameter will also change at this time. When the wireless power supply parameter changes, the sending duration of the wireless power supply signal determined by the network device may no longer be accurate. Therefore, in order to ensure the accuracy of determining the sending duration of the wireless power supply signal by the network device, the terminal may also send indication information to the network device, and indicate that the terminal is in a stationary state or in a moving state.

When the terminal is in the stationary state, an effective duration of the wireless power supply parameter sent by the terminal is longer, or the wireless power supply parameter sent by the terminal may remain unchanged for a longer period of time. Accordingly, the network device may send the wireless power supply signal by using the same sending duration in the longer period of time. When the terminal is in the moving state, the effective duration of the wireless power supply parameter sent by the terminal is shorter, or the wireless power supply parameter sent by the terminal is changeable. At this time, the terminal needs to report the wireless power supply parameter in real time along with the position movement, so that the network device can update the sending duration of the wireless power supply parameter in real time.

In the embodiments of the present disclosure, there is no limit made to the time when the terminal transmits the wireless power supply parameter. If the terminal is in the stationary state, the terminal may only send the wireless power supply parameter to the network device once before the next movement. Alternatively, if the terminal is in the stationary state, the terminal may also send the wireless power supply parameter periodically to the network device in a longer period.

If the terminal is in the moving state, the terminal may send the wireless power supply parameter periodically to the network device in a shorter period. Alternatively, if the terminal is in the moving state, the terminal may determine the time when the wireless power supply parameter is to the network device according to a change degree of the wireless power supply parameter. For example, when the terminal detects that the change degree of the wireless power supply parameter is higher than a threshold, the terminal sends a changed wireless power supply parameter to the network device. Accordingly, when the terminal detects that the change degree of the wireless power supply parameter is lower than the threshold, the terminal does not send the changed wireless power supply parameter to the network device.

For some communication scenarios, because the data to be transmitted between the terminal and the network device (for example, service data) is periodic, and a data amount of the data transmitted in each period is fixed relatively. The data to be transmitted may be sent from the terminal to the network device or from the network device to the terminal. For example, for a terminal used for environmental monitoring, the terminal usually reports environmental monitoring data to the network device periodically according to a certain service period, and the data amount of the environmental monitoring data is relatively fixed. For another example, for a terminal used for industrial monitoring, the terminal usually reports industrial monitoring data to the network device periodically according to a certain service period, and the data amount of industrial monitoring data is fixed relatively.

Therefore, in order to reduce the overhead caused by the network device configuring resources for transmitting data for the terminal, the terminal may transmit data in a manner of grant free transmission. Referring to FIG. 11, in the grant free transmission, the network device may configure a configuration signaling for the grant free transmission to the terminal at one time, and accordingly, the terminal may transmit data periodically on the configured resources in the manner of grant free transmission based on the configuration signaling. The network device does not need to schedule the terminal in the process of data transmission of the terminal.

In the scenario described above, although the data transmission manner is adapted to the grant free transmission, because the terminal itself cannot provide the power for receiving or sending data, the terminal cannot perform grant free transmission autonomously even if the network device sends the configuration signaling for the grant free transmission to the terminal.

Therefore, in order to solve the above problems, the present disclosure also provides a communication method. The network device may provide power for the terminal to perform grant free transmission by sending a wireless power supply signal to the terminal, so that the terminal can perform grant free transmission, thereby reducing the overhead generated by the network device configuring resources for transmitting data for the terminal. A communication method of another embodiment of the present disclosure will be described below with reference to FIG. 12.

Figure 12:
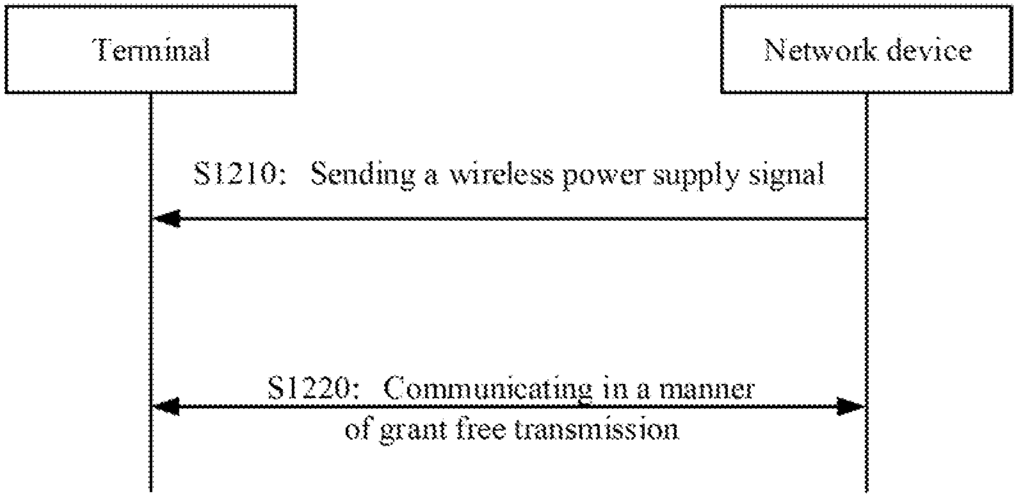
FIG. 12 is a flow diagram of a communication method according to another embodiment of the present disclosure.

FIG. 12 is a flow diagram of a communication method provided by another embodiment of the present disclosure. The method illustrated in FIG. 12 includes operations S1210 to S1220.

At S1210, the network device sends a wireless power supply signal to the terminal.

Figure 10:
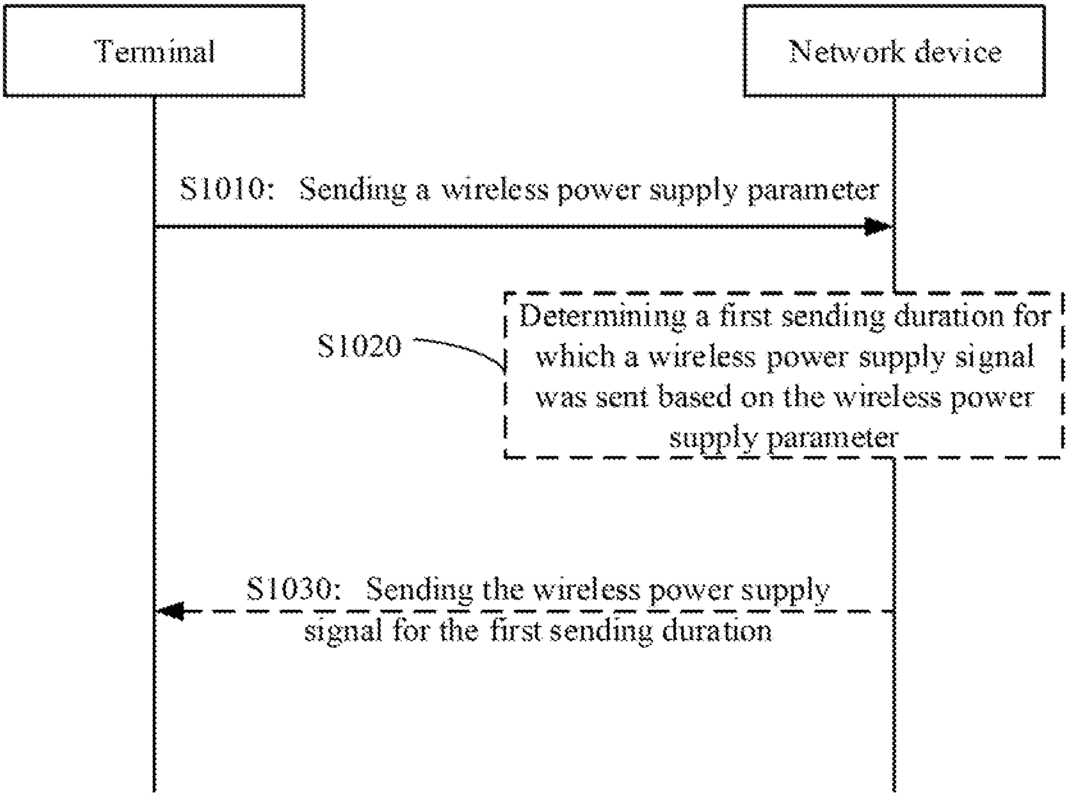
FIG. 10 is a flow diagram of a communication method according to an embodiment of the present disclosure.

In the embodiments of the present disclosure, the network device may send the wireless power supply signal to the terminal using the method illustrated in FIG. 10. Alternatively, the network device may also send the wireless power supply signal to the terminal in a traditional manner.

At S1220, the terminal communicates with the network device in a manner of grant free transmission.

The operation that the terminal communicates with the network device in the manner of the grant free transmission may include that the terminal sends data to the network device in the manner of the grant free transmission, or receives data from the network device in the manner of the grant free transmission.

In some implementations, the wireless power supply signal is transmitted periodically, and a period for transmission of the wireless power supply signal is the same as a period for grant free transmission.

Figure 13:
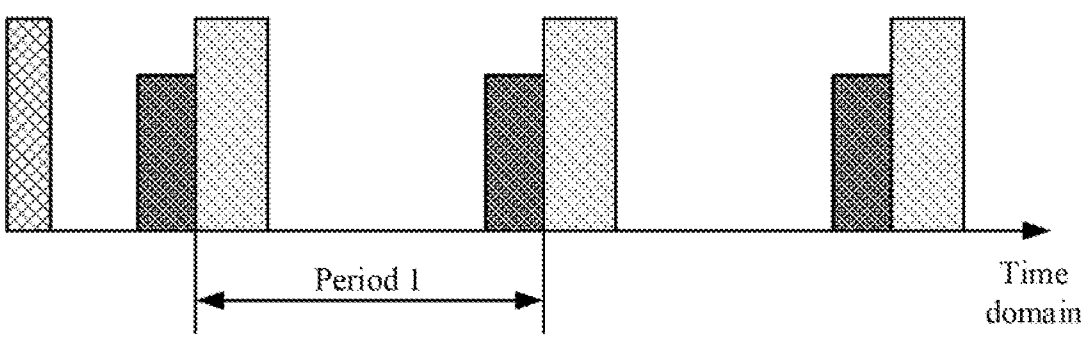
FIG. 13 is a schematic diagram of a communication method according to another embodiment of the present disclosure.

For ease of understanding, a communication procedure according to an embodiment of the present disclosure will be described below with reference to FIG. 13. It is assumed that the network device occupies a time domain resource 1 to transmit configuration information for grant free transmission to the terminal, and the configuration information is used to configure the terminal to perform grant free transmission on a grant free transmission resource according to a period 1. In addition, the network device also takes period 1 as a period and occupies a target time domain resource before the grant free resource to send the wireless power supply signal to the terminal.

Accordingly, taking period 1 as a period, the terminal receives the wireless power supply signal on the target time domain resource to obtain power, and receives or transmits data on the grant free resource after the target time domain resource.

It should be noted that a last time domain symbol of the target time domain resource may be adjacent to a first symbol of the grant free resource, so that the terminal can send and receive data immediately after obtaining enough power through the wireless power supply signal. Alternatively, the last time domain symbol of the target time domain resource and the first symbol of the grant free resource may not be adjacent, for example, separated by several symbols therebetween, so as to reserve some time for the terminal to perform signal processing or obtain data to be transmitted after the terminal obtains enough power. The embodiments of the present disclosure do not specifically limit the positional relationship between the target time domain resource and the grant free resource.

In some implementations, signal processing by the terminal may include encoding the data to be sent by the terminal. Signal processing by the terminal may also include modulating the data to be sent by the terminal. In other implementations, obtaining data to be transmitted by the terminal may for example include harvesting of data to be transmitted by the terminal through a sensing device.

For the terminal, when communicating with the network device, it needs to perform time synchronization with the network device to ensure the accuracy of data transmission. In particular, the zero-power communication terminal described above is usually in a power-off state (or sleep state) when it does not communicate with the network device (for example, it does not need to receive data sent by the network device or send data to the network device). At this time, the terminal does not have enough power to maintain a clock. When the terminal is awakened from the sleep state and receives or sends data, the terminal usually cannot synchronize with the network device. In this way, the data cannot be transmitted correctly between the terminal and the network device.

Therefore, in order to avoid the above problems, the network device may send a synchronization signal or a synchronization channel to the terminal when transmitting data, so that the terminal is synchronized with the network device. In some implementations, a position of a time domain resource occupied by the synchronization signal or the synchronization channel may be located after a position of a time domain resource occupied by the wireless power supply signal. In other words, after the network device sends the wireless power supply signal to the terminal, the network device may send the synchronization signal or the synchronization channel to the terminal. In other implementations, the synchronization channel or synchronization signal may be included in the wireless power supply signal, in which case the terminal may synchronize with the network device while receiving the wireless power supply signal.

In some implementations, the synchronization channel is used to carry an index of a time unit, which may for example be a slot or a sub-frame.

Figure 14:
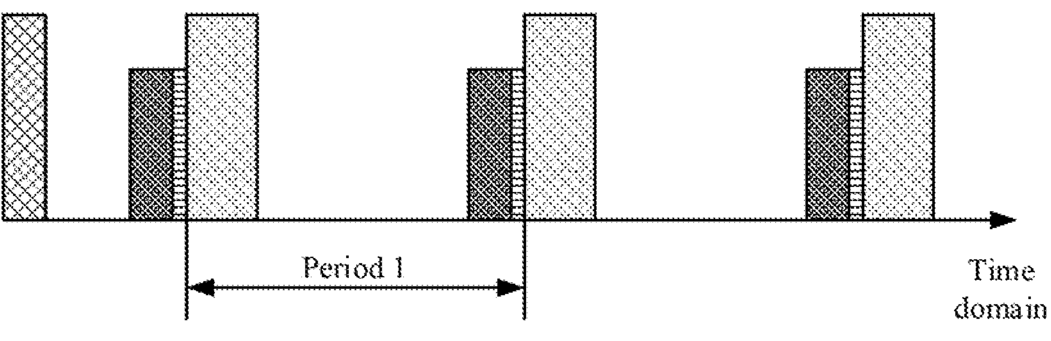
FIG. 14 illustrates a schematic diagram of a synchronization process according to an embodiment of the present disclosure.

For ease of understanding, the synchronization process of an embodiment of the present disclosure is described below with reference to FIG. 14 taking a grant free scenario as an example. It is assumed that the network device occupies a time domain resource 1 to transmit configuration information for grant free transmission to the terminal, and the configuration information is used to configure the terminal to perform grant free transmission on a grant free transmission resource according to a period 1. In addition, the network device occupies the target time domain resource 1 to send the wireless power supply signal for the terminal, and occupies the target time domain resource 2 to send the synchronization signal for the terminal.

The target time domain resource 1 and the target time domain resource 2 are transmission resources configured periodically, where a period for the configuration is also period 1. A position of a time domain of the target time domain resource 1 is located before a position of a time domain of the target rime domain resource 2. The position of the time domain of the target time domain resource 2 is located before a position of a time domain of the grant free transmission resource.

Accordingly, taking period 1 as a period, the terminal receives a wireless power supply signal on the target time domain resource 1 to obtain power, receives a synchronization signal on the target time domain resource 2 to synchronize with the network device, and receives or sends data on the grant free resource.

It should be noted that a last time domain symbol of the target time domain resource 2 may be adjacent to the first symbol of the grant free resource, so that the terminal can send and receive data immediately after synchronizing with the network device through the synchronization signal. Alternatively, the last time domain symbol of the target time domain resource 2 and the first symbol of the grant free resource may not be adjacent, for example, separated by several symbols therebtween, so that sufficient time can be reserved for synchronization between the terminal and the network device. There is no limit made thereto in the embodiments of the present disclosure.

In addition, the last time domain symbol of the target time domain resource 1 may be adjacent to a first symbol of the target time domain resource 2, so that the terminal can synchronize immediately based on the synchronization signal after obtaining enough power through the wireless power supply signal. Alternatively, the last time domain symbol of the target time domain resource 1 and the first symbol of the target time domain resource 2 may not be adjacent, for example, separated by several symbols therebetween, so as to reserve time for synchronization of the terminal. There is no limit made thereto in the embodiments of the present disclosure.

The method embodiments of the present disclosure have been described in detail above with reference to FIG. 1 to FIG. 14, and the apparatus embodiments of the present disclosure will be described in detail below with reference to FIG. 15 to FIG. 19. It should be understood that the description of the method embodiments and the description of the apparatus embodiments correspond to each other and therefore portions not described in detail for the of the apparatus embodiments may be referred to the preceding method embodiments.

Figure 15:
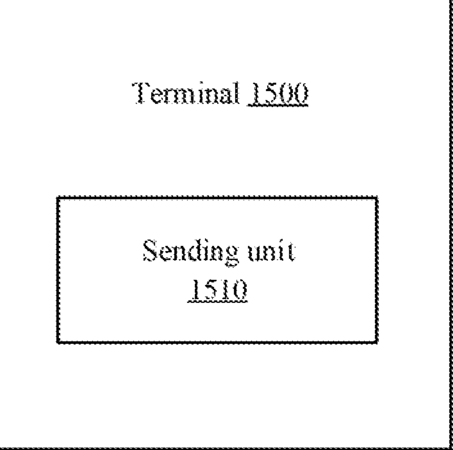
FIG. 15 illustrates a schematic diagram of a terminal according to an embodiment of the present disclosure.

FIG. 15 illustrates a schematic diagram of a terminal according to an embodiment of the present disclosure. As illustrated in FIG. 15, the terminal 1500 includes a sending unit 1510.

The sending unit 1510 is configured to send a wireless power supply parameter. The wireless power supply parameter includes one or more of the following parameters: power harvesting efficiency of the terminal; a power harvesting speed of the terminal; harvesting time required by the terminal for acquiring a preset power; or signal strength of a signal received by the terminal.

Optionally, the terminal further includes: a first receiving unit. The first receiving unit is configured to receive a wireless power supply signal that was sent by a network device for a first sending duration. The first sending duration is determined based on the wireless power supply parameter.

Optionally, the wireless power supply signal is a signal transmitted periodically, and a period for transmission of the wireless power supply signal is the same as a period for grant free transmission.

Optionally, the wireless power supply signal includes a first synchronization signal or a first synchronization channel. The terminal further includes: a first processing unit. The first processing unit is configured to perform synchronization with the network device based on the first synchronization signal or the first synchronization channel.

Optionally, the terminal further includes: a second receiving unit and a second processing unit. The second receiving unit is configured to receive a second synchronization signal or a second synchronization channel sent by the network device, where a position of a time domain resource occupied by the second synchronization signal or the second synchronization channel is located after a position of a time domain resource occupied by the wireless power supply signal. The second processing unit is configured to perform synchronization with the network device based on the second synchronization signal or the second synchronization channel.

Optionally, the sending unit is further configured to send indication information to a network device, where the indication information is used to indicate that the terminal is in a stationary state or in a moving state.

Optionally, the wireless power supply parameter is carried in a radio resource control (RRC) signaling or a medium access control (MAC) control element (CE).

Figure 16:
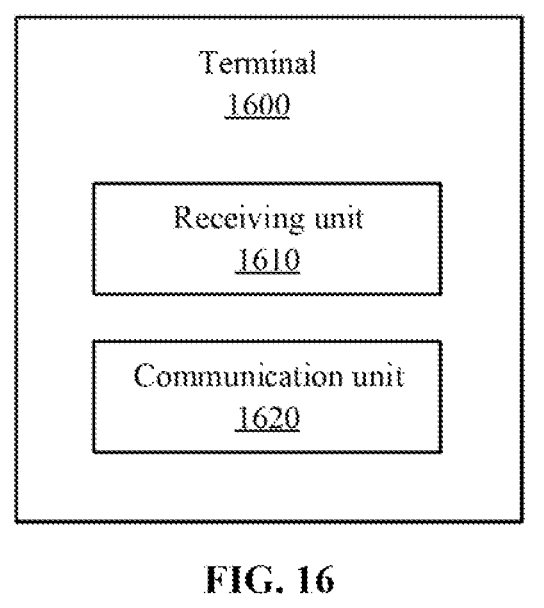

FIG. 16 illustrates a schematic diagram of a terminal according to another embodiment of the present disclosure. As illustrated in FIG. 16, the terminal 1600 includes a receiving unit 1610 and a communication unit 1620.

The receiving unit 1610 is configured to receive a wireless power supply signal sent by a network device.

The communication unit 1620 is configured to send data to the network device in a manner of grant free transmission, or receive data from the network device in the manner of the grant free transmission.

Optionally, the wireless power supply signal includes a first synchronization signal or a first synchronization channel. The terminal further includes: a first processing unit. The first processing unit is configured to perform synchronization with the network device based on the first synchronization signal or the first synchronization channel.

Optionally, the receiving unit is configured to receive a second synchronization signal or a second synchronization channel sent by the network device, where a position synchronization channel is located after a position of a time domain resource occupied by the wireless power supply signal. The terminal further includes a second processing unit, and the second processing unit is configured to perform synchronization with the network device based on the second synchronization signal or the second synchronization channel.

Optionally, the wireless power supply signal is a signal transmitted periodically, and a period for transmission of the wireless power supply signal is the same as a period for grant free transmission.

Optionally, the first synchronization channel is used to carry an index of a time unit.

Optionally, the second synchronization channel is used to carry an index of a time unit.

Figure 17:
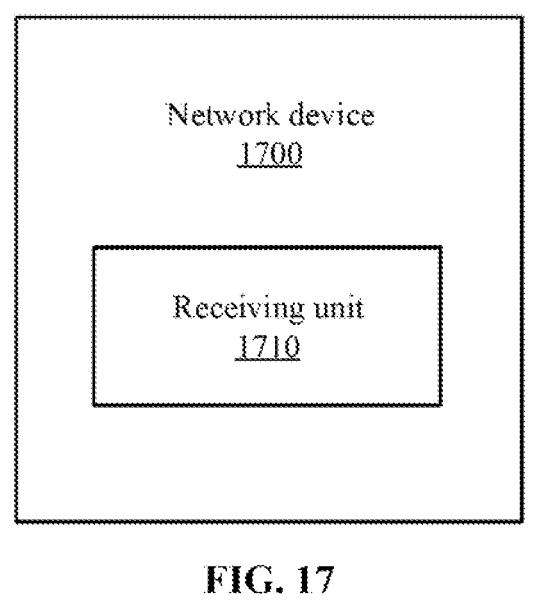

FIG. 17 is a schematic diagram of a network device according to an embodiment of the present disclosure. As illustrated in FIG. 17, the network device 1700 includes a receiving unit 1710.

The receiving unit 1710 is configured to receive a wireless power supply parameter sent by a terminal. The wireless power supply parameter includes one or more of the following parameters: power harvesting efficiency of the terminal; a power harvesting speed of the terminal; harvesting time required by the terminal for acquiring a preset power; or a signal strength of a signal received by the terminal.

Optionally, the network device further includes a processing unit and a first sending unit. The processing unit is configured to determine a first sending duration for which a wireless power supply signal was sent based on the wireless power supply parameter. The first sending unit is configured to send the wireless power supply signal to the terminal for the first sending duration.

Optionally, the terminal transmits data in a manner of grant free transmission, the wireless power supply signal is a signal transmitted periodically, and a period for transmission of the wireless power supply signal is the same as a period for the grant free transmission.

Optionally, the wireless power supply signal includes a first synchronization signal or a first synchronization channel.

Optionally, the network device further includes a second sending unit. The second sending unit is configured to send a second synchronization signal or a second synchronization channel to the terminal. A position of a time domain resource occupied by the second synchronization signal or the second synchronization channel is located after a position of a time domain resource occupied by the wireless power supply signal.

Optionally, the receiving unit is configured to receive indication information sent by the terminal. The indication information is used to indicate that the terminal is in a stationary state or in a moving state.

Optionally, the wireless power supply parameter is carried in an RRC signaling or an MAC CE.

Figure 18:
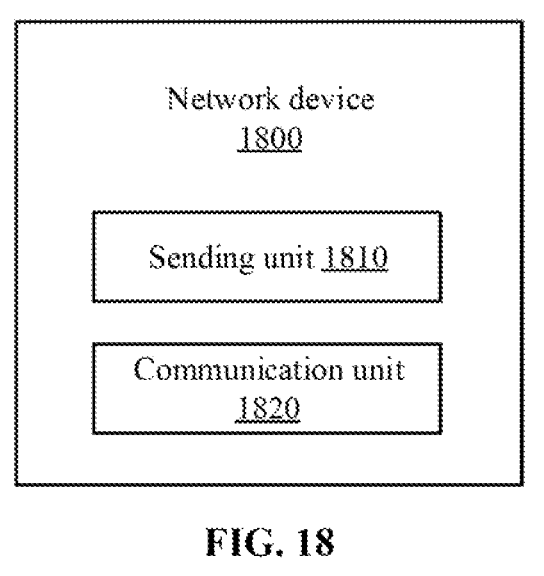

FIG. 18 is a schematic diagram of a network device according to another embodiment of the present disclosure. As illustrated in FIG. 18, the network device 1800 includes a sending unit 1810 and a communication unit 1820.

The sending unit 1810 is configured to send a wireless power supply signal to a terminal.

The communication unit 1820 is configured to receive data that is sent by the terminal in a manner of grant free transmission, or send data to the terminal in the manner of the grant free transmission.

Optionally, the wireless power supply signal includes a first synchronization signal or a first synchronization channel.

Optionally, the second sending unit is configured to send a second synchronization signal or a second synchronization channel to the terminal. A position of a time domain resource occupied by the second synchronization signal or the second synchronization channel is located after a position of a time domain resource occupied by the wireless power supply signal.

Optionally, the wireless power supply signal is a signal transmitted periodically, and a period for transmission of the wireless power supply signal is the same as a period for grant free transmission.

Optionally, the first synchronization channel is used to carry an index of a time unit.

Optionally, the second synchronization channel is used to carry an index of a time unit.

Figure 19:
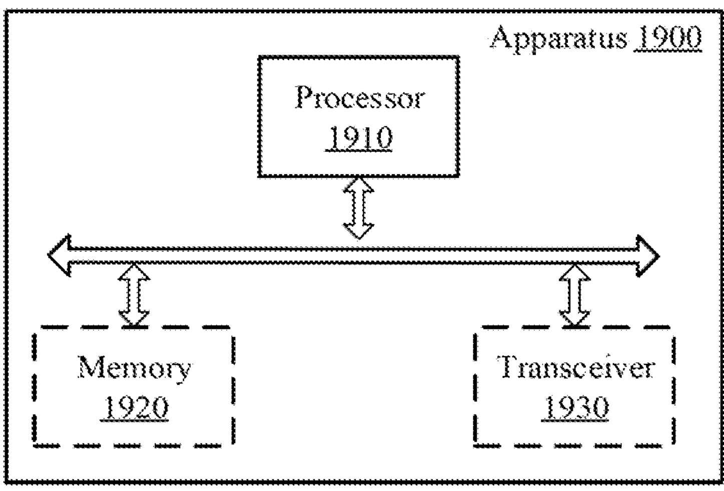
FIG. 19 is a schematic structural diagram of a communication apparatus according to an embodiment of the present disclosure.

FIG. 19 is a schematic structural diagram of a communication apparatus according to an embodiment of the present disclosure. The dotted line in FIG. 19 indicates that the unit or module is optional. The apparatus 1900 may be used to implement the methods described in the above method embodiments. The apparatus 1900 may be a chip, a terminal device or a network device.

The apparatus 1900 may include one or more processors 1910. The processor 1910 may support the apparatus 1900 to implement the methods described previously in the method embodiments. The processor 1910 may be a general purpose processor or a special-purpose processor. For example, the processor may be a central processing unit (CPU). Optionally, the processor may be another general purpose processor, a digital signal processor (DSP), an application specific integrated circuit (ASIC), a field programmable gate array (FPGA) or other programmable logic devices, discrete gates or transistor logic devices, or discrete hardware components. The general purpose processor may be a microprocessor or any conventional processor.

The apparatus 1900 may further include one or more memories 1920. The memory 1920 stores a program that may be executed by processor 1910 such that the processor 1910 performs the methods described previously in the method embodiments. The memory 1920 may be independent of the processor 1910 or may be integrated within the processor 1910.

The apparatus 1900 may also include a transceiver 1930. The processor 1910 may 1910 may communicate with other devices or chips through the transceiver 1930. For example, the processor 1910 may transmit and receive data with other devices or chips via the transceiver 1930.

In an embodiment of the present disclosure, there is further provided a computer-readable storage medium, configured to store a program. The computer-readable storage medium may be applied to the terminal or the network device provided by the embodiments of the present disclosure, and the program causes a computer to perform the method implemented by the terminal or the network device in various embodiments of the present disclosure.

In an embodiment of the present disclosure, there is further provided a computer program product. The computer program product includes a program. The computer program product may be applied to the terminal or the network device provided by the embodiments of the present disclosure, and the program causes a computer to perform the method implemented by the terminal or the network device in various embodiments of the present disclosure.

In an embodiment of the present disclosure, there is further provided a computer program. The computer program may be applied to the terminal or the network device provided by the embodiments of the present disclosure, and the computer program causes a computer to perform the method implemented by the terminal or the network device in various embodiments of the present disclosure.

According to the embodiments of the present disclosure, the terminal may send a wireless power supply parameter to the network device to indicate the power required by the terminal to the network device, so that the network device may determine a sending duration of the wireless power supply signal based on the wireless power supply parameter, which is beneficial to improving the utilization rate of resources in the communication system. In addition, the problem of resource waste caused by the network device sending the wireless power supply signal according to a sending duration corresponding to a power that exceeds the power required by the terminal (that is, a conservative sending duration) in the traditional transmission process of the wireless power supply signal is avoided.

It should be understood that the terms "system" and "network" in the present disclosure may be used interchangeably. In addition, Terms used in the present disclosure are used only for explanation of specific embodiments of the present disclosure and are not intended to be limiting. Terms "first", "second", "third", "fourth", etc. in the description and claims of the present disclosure and the above drawings are used to distinguish different objects, and are not used to describe a particular order. Furthermore, the terms "comprising/including" and "having" and any variations thereof are intended to cover non-exclusive inclusion.

The "indicate" mentioned in the embodiments of the present disclosure may be a direct indication, may be an indirect indication, or may indicate an association relationship. For example, A indicates B, which may mean that A directly indicates B, for example, B may be obtained through A. It may also mean that A indirectly indicates B, for example, A indicates C, and B may be obtained by C. It may also indicate that there is an association relationship between A and B.

In the embodiments of the present disclosure, "B corresponding to A" means that B is associated with A, and B may be determined based on A. It should also be understood, however, that determining B based on A does not mean determining B based on A alone, but may also mean determining B based on A and/or other information.

In the embodiments of the present disclosure, the term "correspond" may mean that there is a direct correspondence or an indirect correspondence relationship between the two, or may also mean that there is an association relationship between the two, or may also be a relationship between indication and being indicated, configuration and being configured, etc.

In embodiments of the present disclosure, the "predefined" or "pre-configured" may be implemented by pre-storing corresponding codes, tables, or other manners that may be used to indicate relevant information in devices (e.g., including terminal devices and network devices), the specific implementation of which is not limited by the present disclosure. For example, predefined may refer to being defined in the protocol.

In embodiments of the present disclosure, the "protocol" may refer to standard protocols in the communication field, such as LTE protocol, NR protocol, and related protocols applied in future communication systems, which are not limited herein.

In the embodiments of the present disclosure, the term "and/or" is used to describe an association relationship of associated objects, and represents that there may be three relationships. For example, A and/or B may represent the following three situations: i.e., independent existence of A, existence of both A and B and independent existence of B. In addition, the character "/" in the present disclosure generally represents that an "or" relationship is formed between the previous and next associated objects.

In various embodiments of the present disclosure, the size of the sequence numbers of the above processes does not mean the order of execution, and the execution order of each process should be determined by its function and inherent logic, and should not construct any limitation to the implementation process of the embodiments of the present disclosure.

In several embodiments provided herein, it should be understood that the disclosed systems, apparatuses and methods may be implemented in other manners. For example, the above-described embodiments of the apparatus are only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

In the above-described embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the flows or functions described in accordance with the embodiments of the present disclosure are generated in whole or in part. The computer may be a general purpose computer, a special purpose computer, a computer network, or other programmable device. The computer instructions may be stored in a computer-readable storage medium, or transmitted from one computer-readable storage medium to another. For example, the computer instructions may be transmitted from a web site, computer, server, or data center to another web site, computer, server, or data center via wired (e.g. coaxial cable, optical fiber, digital subscriber line (DSL)) or wireless (e.g. infrared, wireless, microwave, etc.). The computer-readable storage medium may be any usable medium that a computer may read or a data storage device containing one or more usable media integration, such as a server, data center, etc. The usable medium may be a magnetic medium (e.g. floppy disk, hard disk, magnetic tape), an optical medium (e.g. digital video disc (DVD)), or a semiconductor medium (e.g. solid state disk (SSD)), etc.

The above is only the specific implementations of the present disclosure, but the scope of protection of the present disclosure is not limited thereto. Any person skilled in the art may easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A communication method, comprising:

sending, by a terminal, a wireless power supply parameter, wherein the wireless power supply parameter comprises one or more of the following parameters:

power harvesting efficiency of the terminal;

a power harvesting speed of the terminal; or harvesting time required by the terminal for acquiring a preset power, the method further comprising:

receiving, by the terminal, a wireless power supply signal that was sent by a network device for a first sending duration, wherein the first sending duration is determined based on the wireless power supply parameter, wherein the terminal transmits data in a manner of grant free transmission, the wireless power supply signal is a signal transmitted periodically, and a period for transmission of the wireless power supply signal is the same as a period for the grant free transmission.

2. The method of claim 1, wherein the wireless power supply signal comprises a first synchronization signal or a signal that is transmitted on a first synchronization channel; the method further comprising:

performing, by the terminal, synchronization with the network device based on the first synchronization signal or the first synchronization channel.

3. The method of claim 1, further comprising:

receiving, by the terminal, a second synchronization signal or a second synchronization channel sent by the network device, wherein a position of a time domain resource occupied by the second synchronization signal or the second synchronization channel is located after a position of a time domain resource occupied by the wireless power supply signal; and performing, by the terminal, synchronization with the network device based on the second synchronization signal or the second synchronization channel.

4. The method of claim 1, further comprising:

sending, by the terminal, indication information to the network device, wherein the indication information is used to indicate that the terminal is in a stationary state or in a moving state.

5. The method of claim 1, wherein the wireless power supply parameter is carried in a radio resource control (RRC) signaling or a medium access control (MAC) control element (CE).

6. A communication method, comprising:

receiving, by a network device, a wireless power supply parameter sent by a terminal, wherein the wireless power supply parameter comprises one or more of the following parameters:

power harvesting efficiency of the terminal;

a power harvesting speed of the terminal; or harvesting time required by the terminal for acquiring a preset power, the method further comprising:

determining, by the network device, a first sending duration for which a wireless power supply signal was sent based on the wireless power supply parameter; and sending, by the network device, the wireless power supply signal to the terminal for the first sending duration, wherein the terminal transmits data in a manner of grant free transmission, the wireless power supply signal is a signal transmitted periodically, and a period for transmission of the wireless power supply signal is the same as a period for the grant free transmission.

7. The method of claim 6, wherein the wireless power supply signal comprises a first synchronization signal or a signal that is transmitted on a first synchronization channel.

8. The method of claim 6, further comprising:

sending, by the network device, a second synchronization signal or a second synchronization channel to the terminal, wherein a position of a time domain resource occupied by the second synchronization signal or the second synchronization channel is located after a position of a time domain resource occupied by the wireless power supply signal.

9. The method of claim 6, further comprising:

receiving, by the network device, indication information sent by the terminal, wherein the indication information is used to indicate that the terminal is in a stationary state or in a moving state.

10. A terminal, comprising:

a transceiver, configured to send a wireless power supply parameter, wherein the wireless power supply parameter comprises one or more of the following parameters:

power harvesting efficiency of the terminal;

a power harvesting speed of the terminal; or harvesting time required by the terminal for acquiring a preset power, wherein the transceiver is further configured to:

receive a wireless power supply signal that was sent by a network device for a first sending duration, wherein the first sending duration is determined based on the wireless power supply parameter, wherein the terminal transmits data in a manner of grant free transmission, the wireless power supply signal is a signal transmitted periodically, and a period for transmission of the wireless power supply signal is the same as a period for the grant free transmission.

11. The terminal of claim 10, wherein the wireless power supply signal comprises a first synchronization signal or a signal that is transmitted on a first synchronization channel;

the terminal further comprising:

a processor, configured to perform synchronization with the network device based on the first synchronization signal or the first synchronization channel.

12. The terminal of claim 10, wherein the transceiver is further configured to receive a second synchronization signal or a second synchronization channel sent by the network device, wherein a position of a time domain resource occupied by the second synchronization signal or the second synchronization channel is located after a position of a time domain resource occupied by the wireless power supply signal;

the terminal further comprising:

a processor, configured to perform synchronization with the network device based on the second synchronization signal or the second synchronization channel.

13. The terminal of claim 10, wherein the transceiver is further configured to send indication information to the network device, wherein the indication information is used to indicate that the terminal is in a stationary state or in a moving state.

14. A network device, comprising:

a transceiver, configured to receive a wireless power supply parameter sent by a terminal, wherein the wireless power supply parameter comprises one or more of the following parameters:

power harvesting efficiency of the terminal;

a power harvesting speed of the terminal; or harvesting time required by the terminal for acquiring a preset power, wherein the network device further comprises:

a processor, configured to determine a first sending duration for which a wireless power supply signal was sent based on the wireless power supply parameter; and the transceiver is further configured to send the wireless power supply signal to the terminal for the first sending duration, wherein the terminal transmits data in a manner of grant free transmission, the wireless power supply signal is a signal transmitted periodically, and a period for transmission of the wireless power supply signal is the same as a period for the grant free transmission.

15. The network device of claim 14, wherein the transceiver is further configured to:

send a second synchronization signal or a second synchronization channel to the terminal, wherein a position of a time domain resource occupied by the second synchronization signal or the second synchronization channel is located after a position of a time domain resource occupied by the wireless power supply signal.

16. The network device of claim 14, wherein the transceiver is further configured to receive indication information sent by the terminal, wherein the indication information is used to indicate that the terminal is in a stationary state or in a moving state.

* * * * *